US012115116B2

(12) United States Patent
Zoni, III et al.

(10) Patent No.: US 12,115,116 B2
(45) Date of Patent: Oct. 15, 2024

(54) SUPPORT SYSTEM INCLUDING LAYERS OF SPACER FABRIC AND NON-VISCOELASTIC PRESSURE RELIEF MATERIAL, AND METHOD FOR MEASURING PRESSURE AND PRESSURE DISTRIBUTION PROPERTIES OF A SUPPORT SYSTEM

(71) Applicant: IGE, LLC, Princeton, NJ (US)

(72) Inventors: Bartholomew Zoni, III, Princeton, NJ (US); Debbie Carlitz, Princeton, NJ (US)

(73) Assignee: IGE, LLC, Princeton, NJ (US)

( * ) Notice: Subject to any disclaimer, the term of this patent is extended or adjusted under 35 U.S.C. 154(b) by 0 days.

(21) Appl. No.: 15/930,929

(22) Filed: May 13, 2020

(65) Prior Publication Data

US 2020/0360210 A1 Nov. 19, 2020

Related U.S. Application Data

(60) Provisional application No. 62/847,543, filed on May 14, 2019.

(51) Int. Cl.
*A47C 27/00* (2006.01)
*A47C 27/05* (2006.01)
(Continued)

(52) U.S. Cl.
CPC .......... *A61G 7/05715* (2013.01); *A47C 27/05* (2013.01); *A47C 27/06* (2013.01);
(Continued)

(58) Field of Classification Search
CPC ......... A47C 27/00; A47C 27/12; A47C 27/14; A47C 27/15; A47C 27/121; A47C 31/006;
(Continued)

(56) References Cited

U.S. PATENT DOCUMENTS

| | | | |
|---|---|---|---|
| 4,518,640 | A | 5/1985 | Wilkens |
| 5,022,111 | A | 6/1991 | Fenner, Sr. |

(Continued)

FOREIGN PATENT DOCUMENTS

| | | | |
|---|---|---|---|
| CN | 102613836 | A | 8/2012 |
| DE | 20309794 | U1 | 10/2003 |

(Continued)

OTHER PUBLICATIONS

Written Opinion of the International Searching Authority dated Aug. 10, 2020, issued in International Application No. PCT/US2020/032732 (12 pages).

(Continued)

*Primary Examiner* — Justin C Mikowski
*Assistant Examiner* — Ifeolu A Adeboyejo
(74) *Attorney, Agent, or Firm* — Hoffmann & Baron, LLP

(57) ABSTRACT

A support system for the human body including two layers of 3D spacer fabric and one or more layers of a non-viscoelastic pressure relief material, such as a non-viscoelastic slow-recovery foam, latex foam, gel matrix or micro-coil, is disclosed. The support system reduces point pressure and evenly distributes pressure along the body, while providing a soft feel and more even and smooth transitions of movement.

13 Claims, 2 Drawing Sheets

(51) Int. Cl.

| | |
|---|---|
| ***A47C 27/06*** | (2006.01) |
| ***A47C 27/08*** | (2006.01) |
| ***A47C 27/12*** | (2006.01) |
| ***A47C 27/14*** | (2006.01) |
| ***A47C 27/15*** | (2006.01) |
| ***A47C 27/16*** | (2006.01) |
| ***A47C 27/22*** | (2006.01) |
| ***A47G 9/10*** | (2006.01) |
| ***A61G 7/057*** | (2006.01) |
| ***A63B 21/00*** | (2006.01) |

(52) U.S. Cl.

CPC ............ *A47C 27/085* (2013.01); *A47C 27/12* (2013.01); *A47C 27/127* (2013.01); *A47C 27/148* (2013.01); *A47C 27/15* (2013.01); *A47C 27/16* (2013.01); *A47C 27/22* (2013.01); *A47G 9/10* (2013.01); *A63B 21/4037* (2015.10); *A47G 2009/1018* (2013.01)

(58) Field of Classification Search

CPC ..... A47C 27/22; A47C 27/148; A47C 27/124; A47G 2009/1018; A47G 9/1009; A61G 7/0515

See application file for complete search history.

(56) References Cited

U.S. PATENT DOCUMENTS

| | | | | |
|---|---|---|---|---|
| 5,385,036 | A | 1/1995 | Spillane et al. | |
| 5,522,240 | A | 6/1996 | Wall et al. | |
| 5,735,145 | A | 4/1998 | Pernick | |
| 5,787,525 | A * | 8/1998 | Sugihara | A47C 31/00 5/421 |
| 6,630,414 | B1 | 10/2003 | Matsumoto | |
| 6,779,369 | B2 | 8/2004 | Shepherd | |
| 6,808,230 | B2 | 10/2004 | Buss et al. | |
| 6,895,620 | B1 | 5/2005 | Rensink | |
| 6,988,286 | B2 | 1/2006 | Schecter et al. | |
| 7,174,750 | B2 | 2/2007 | Shirasaki et al. | |
| 7,191,480 | B2 | 3/2007 | Romano et al. | |
| 7,201,024 | B2 | 4/2007 | Hirayama et al. | |
| 7,240,522 | B2 | 7/2007 | Kondou et al. | |
| 7,284,494 | B2 | 10/2007 | Rensink | |
| 7,418,837 | B2 | 9/2008 | Muller et al. | |
| 7,607,730 | B2 | 10/2009 | Moseneder | |
| 7,617,788 | B2 | 11/2009 | Rensink | |
| 7,779,654 | B2 | 8/2010 | Garus | |
| 7,814,625 | B2 | 10/2010 | Russell et al. | |
| 7,827,829 | B2 | 11/2010 | Fujikawa | |
| 7,837,263 | B2 | 11/2010 | Booth et al. | |
| 8,196,240 | B2 | 6/2012 | Meyer et al. | |
| 8,298,644 | B2 | 10/2012 | Booth | |
| 8,359,689 | B2 | 1/2013 | Warren et al. | |
| 8,490,233 | B2 | 7/2013 | Essers | |
| 8,491,514 | B2 | 7/2013 | Creighton et al. | |
| 8,512,843 | B2 | 8/2013 | Villata | |
| 8,569,190 | B2 | 10/2013 | Baychar | |
| 8,765,253 | B1 | 7/2014 | Smaldone et al. | |
| 8,772,187 | B2 | 7/2014 | Ugbolue et al. | |
| 8,832,884 | B2 | 9/2014 | Stacy et al. | |
| 8,910,334 | B2 | 12/2014 | Lafleche et al. | |
| 9,095,481 | B2 | 8/2015 | Essers | |
| D738,644 | S | 9/2015 | Reynolds | |
| 9,131,781 | B2 | 9/2015 | Zaiss et al. | |
| 9,138,064 | B2 | 9/2015 | Tursi, Jr. et al. | |
| 9,211,017 | B2 | 12/2015 | Tyree | |
| 9,259,897 | B2 | 2/2016 | Villata | |
| 9,615,984 | B2 | 4/2017 | Trabucco | |
| 9,814,641 | B2 | 11/2017 | Brykalski et al. | |
| 9,895,011 | B2 | 2/2018 | Alletto, Jr. | |
| 9,936,816 | B2 | 4/2018 | Lowe | |
| 9,980,586 | B2 | 5/2018 | Alletto, Jr. | |
| 10,151,054 | B2 | 12/2018 | Mueller et al. | |
| 2002/0104335 | A1 | 8/2002 | Shirasaki et al. | |
| 2006/0228528 | A1 | 10/2006 | Link et al. | |
| 2006/0260058 | A1* | 11/2006 | Schmidt | A47C 21/046 5/636 |
| 2007/0232172 | A1 | 10/2007 | Biermann | |
| 2007/0261173 | A1 | 11/2007 | Schlussel | |
| 2007/0271705 | A1 | 11/2007 | Woolfson et al. | |
| 2008/0028517 | A1* | 2/2008 | Schmidt | A47C 21/046 5/421 |
| 2008/0301983 | A1* | 12/2008 | Murphy | A47C 27/08 40/360 |
| 2010/0088818 | A1 | 4/2010 | Rock et al. | |
| 2011/0047710 | A1* | 3/2011 | Beard | A47C 31/006 5/724 |
| 2011/0173757 | A1* | 7/2011 | Rensink | A47C 27/15 5/698 |
| 2011/0252572 | A1 | 10/2011 | Morrison | |
| 2013/0010431 | A1 | 1/2013 | Ogatsu et al. | |
| 2013/0025061 | A1 | 1/2013 | Yoo | |
| 2013/0025070 | A1* | 1/2013 | Ruehlmann | A47C 27/15 5/740 |
| 2013/0104311 | A1 | 5/2013 | Rensink et al. | |
| 2013/0167303 | A1 | 7/2013 | Essers | |
| 2013/0174344 | A1* | 7/2013 | Klancnik | A47C 27/064 5/636 |
| 2013/0263377 | A1* | 10/2013 | Wootten, Jr. | A47C 27/15 5/640 |
| 2014/0033441 | A1* | 2/2014 | Morgan | A47C 31/006 5/724 |
| 2014/0141233 | A1* | 5/2014 | Crawford | A47C 7/18 428/319.7 |
| 2014/0182063 | A1* | 7/2014 | Crawford | C08G 18/7671 5/636 |
| 2014/0183403 | A1* | 7/2014 | Peterson | A47G 9/10 252/75 |
| 2014/0208517 | A1* | 7/2014 | Gross | A47C 27/085 5/691 |
| 2014/0237726 | A1 | 8/2014 | Gibson et al. | |
| 2015/0067967 | A1* | 3/2015 | Tyree | A47C 27/144 5/691 |
| 2016/0157631 | A1* | 6/2016 | Milnes | A47C 27/005 5/699 |
| 2016/0250824 | A1 | 9/2016 | Krishnasamy et al. | |
| 2016/0326674 | A1 | 11/2016 | Goijarts et al. | |
| 2017/0071372 | A1 | 3/2017 | Alletto, Jr. | |
| 2017/0079444 | A1 | 3/2017 | Blazar | |
| 2018/0098637 | A1 | 4/2018 | Griese et al. | |
| 2019/0125092 | A1* | 5/2019 | Ando | D04H 3/16 |
| 2022/0015550 | A1* | 1/2022 | Bauer | A47C 27/144 |

FOREIGN PATENT DOCUMENTS

| | | | |
|---|---|---|---|
| DE | 102004037625 | A1 | 3/2006 |
| DE | 102009013253 | A1 | 9/2010 |
| DE | 102014216450 | A1 | 2/2016 |
| EP | 1576908 | A2 | 9/2005 |
| JP | 2002010881 | A | 1/2002 |
| JP | 2013023044 | A | 2/2013 |
| KR | 2010 0008646 | U | 9/2010 |
| NO | 2007034311 | A2 | 3/2007 |
| WO | 2008009712 | A1 | 1/2008 |
| WO | 2014062187 | A1 | 4/2014 |
| WO | 2014062188 | A1 | 4/2014 |
| WO | 2014092924 | A1 | 6/2014 |

OTHER PUBLICATIONS

International Search Report dated Aug. 10, 2020, issued in International Application No. PCT/US2020/032732 (6 pages).

Gunningberg et al., "Effect of visco-elastic foam mattresses on the development of pressure ulcers in patients with hip fractures," *Journal of Wound Care*, 9(10):455-460 (Nov. 2000).

Li et al., "Exploring the effect of mattress cushion materials on human-mattress interface temperatures, pre-sleep thermal state and sleep quality," *Indoor and Built Environment*, vol. 30, Issue 5, pp. 1-15 (first published online Feb. 10, 2020).

(56) References Cited

OTHER PUBLICATIONS

Low et al., "Pressure Profiles in Different Sleeping Postures," *Journal of Chiropractic Medicine*, 16(1):1-9 (Mar. 2017; epublished Oct. 21, 2016).
Okrasa et al., "Viscoelastic Polyurethane Foams with Reduced Flammability and Cytotoxicity," *Materials*, 15(1):151, 27 pp. (published online Dec. 26, 2021).
Ozyurek et al., "Prevention of Pressure Ulcers in the Intensive Care Unit. A Randomized Trial of 2 Viscoelastic Foam Support Surfaces," *Clinical Nurse Specialist*, 29(4):210-217 (Jul./Aug. 2015).
Shuvo et al., "Prospect of 3D Warp Knitted Spacer Fabric and its Effect on Pressure Relieve for Reducing the Prevalence of Pressure Ulcers for Immobile Patients," *Journal of Textile Science & Engineering*, vol. 8, Issue 1, 4 pages (Jan. 2018).
Whittemore, "Pressure-Reduction Support Surfaces: A Review of the Literature," *Journal of WOCN*, 25(1):6-25 (Jan. 1998).
Wu et al., "3D Spacer Fabric Structure for the Prevention and Care of Pressure Ulcers," *IEEE Access*, vol. 8, pp. 213512-213521 (Dec. 1, 2020).

* cited by examiner

SUPPORT SYSTEM INCLUDING LAYERS OF SPACER FABRIC AND NON-VISCOELASTIC PRESSURE RELIEF MATERIAL, AND METHOD FOR MEASURING PRESSURE AND PRESSURE DISTRIBUTION PROPERTIES OF A SUPPORT SYSTEM

CROSS-REFERENCE TO RELATED APPLICATION

This application claims priority to U.S. Provisional Application No. 62/847,543, filed on May 14, 2019, the entire contents of which are incorporated herein by reference.

FIELD OF THE INVENTION

This disclosure relates to a support system, for example, a mattress, cushion, pad, pillow, mattress topper, sleeping pad, hospital bed, seat cushion, or other support for the whole or part of a human body, including two layers of 3D spacer fabric and one or more layers of non-viscoelastic comfort material, such as slow-recovery latex foam, micro-coil springs, natural fiber, grids of rubber, synthetic rubber or gel matrix, or soft latex foam, which may optionally be combined with various other layers beneath, between, or on top of each. Also disclosed is a method for measuring pressure and pressure distribution properties of a support system.

BACKGROUND OF THE INVENTION

A comfortable mattress can be a significant factor in leading to optimal sleep and its associated health benefits. Classic support systems, particularly mattresses, traditionally comprise firmer base layers (typically springs or foams) with softer materials (such as fiber, springs or foam) toward the top of the structure to provide support and comfort to the human body when laying prone. Some manufacturers have incorporated this padding into the top panel quilting, while others have incorporated comfort materials into a compartmentalized structure at the top of the bed, often referred to as pillow top mattresses. Others have developed and use memory foam in one or more of these layers.

Memory foams, or viscoelastic foams, are a type of flexible polyurethane foams that exhibit low resilience and slow recovery after compression. These viscoelastic products also tend to react to body temperature and ambient temperature, softening with heat.

However, memory foams for mattress applications have many drawbacks. For one, they can expose sleepers to harmful chemicals. Petrochemicals, isocyanates and other undesirable compounds are often used in the manufacturing of memory foams. Mattresses containing memory foam can expose sleepers to an array of volatile organic compounds (VOCs) after manufacture, which may result in adverse effects for customers, including feelings of illness or discomfort. VOCs associated with memory foam mattresses have included chlorofluorocarbons (CFCs), formaldehyde, benzene, methylene chloride, toluene, trichloroethane, naphthalene, perfluorocarbons.

Second, viscoelastic foams absorb and retain heat, thereby increasing the body's temperature during sleep. Elevated body temperature is not ideal for healthy sleep, as the body seeks to reduce core body temperature while sleeping. Sleep disruption and discomfort can result from the temperature properties of memory foam.

Third, while viscoelastic foam's physical properties can reduce physical pressure on the body in some scenarios, it also promotes a "sinking in" effect where the body's weight creates a physical indentation. This makes it more physically demanding for the body to move while sleeping, creating unnecessary stress especially for those with back pain. In addition, memory foam can restrict airflow in the mattress.

The human spine is often described as "S" shaped but has 4 natural curves that roughly describe regions of the back and neck. Moving from the neck to the base of the spine, these are the Cervical, Thoracic, Lumbar and Pelvic regions. An ideal support system adapts to provide support evenly across all regions of this lorodotic curve. Traditional mattress designs unfortunately exert the most pressure on the cervical and pelvic spine and offer little or no support of the thoracic and upper lumbar regions—creating an imbalance that can contribute to back pain and other musculoskeletal sequelae. In a supine position, laying on a traditionally constructed mattress, up to 76% of the body's weight is distributed to the shoulders and hips/buttocks. In a side-sleep position, the pressure experienced by the shoulder and hips can be even greater.

There remains a need for a support system, such as a mattress, that supports the human body, reduces stress and pressure points, distributes pressure evenly, and creates ease of movement and comfort.

SUMMARY OF THE INVENTION

A support system is disclosed having a first 3D spacer layer having a first thickness, a second 3D spacer layer having a second thickness, and a non-viscoelastic pressure relieving layer having a third thickness. The first 3D spacer layer is positioned below the second 3D spacer layer and the non-viscoelastic pressure relieving layer; and the first thickness is equal to or greater than the second thickness. The non-viscoelastic pressure relieving layer may comprise slow-recovery latex, and/or be about 0.5 inches to about 2 inches thick.

The first 3D spacer layer may be about 10 mm to about 50 mm thick, and/or have a stress compression value of about 2.0 kPa to about 8.0 kPa with sufficient structure to support the layers above the first 3D spacer layer and a human body. The second 3D spacer layer may be about 5 mm to about 20 mm thick, and/or have a stress compression value of about 0.5 kPa to about 7.0 kPa with sufficient structure to support the layers above the second 3D spacer layer and a human body.

The non-viscoelastic pressure relieving layer may be positioned below or above the second 3D spacer layer. One or more layers of material may be positioned between the second 3D spacer layer and the non-viscoelastic pressure relieving layer, and above the first 3D spacer layer.

A method of evaluating pressure and pressure distribution properties of a support system is also disclosed. The method includes calculating a Back Pressure and Support Score (BPSS), Spine Pressure and Support Score (BPSS), or Total Pressure and Support Score (TPSS). The method includes the steps of: placing a pressure sensing mat on top of the support system; covering the pressure sensing mat with a tight fitting material; placing a subject on his/her back within an analysis area of the covered pressure sensing mat; measuring a first pressure reading from the pressure sensing mat; placing the subject on his/her side within the analysis area;

measuring a second pressure reading from the pressure sensing mat; analyzing data; and tabulating the respective BPSS, SPSS or TPSS.

DETAILED DESCRIPTION

Figure 1:
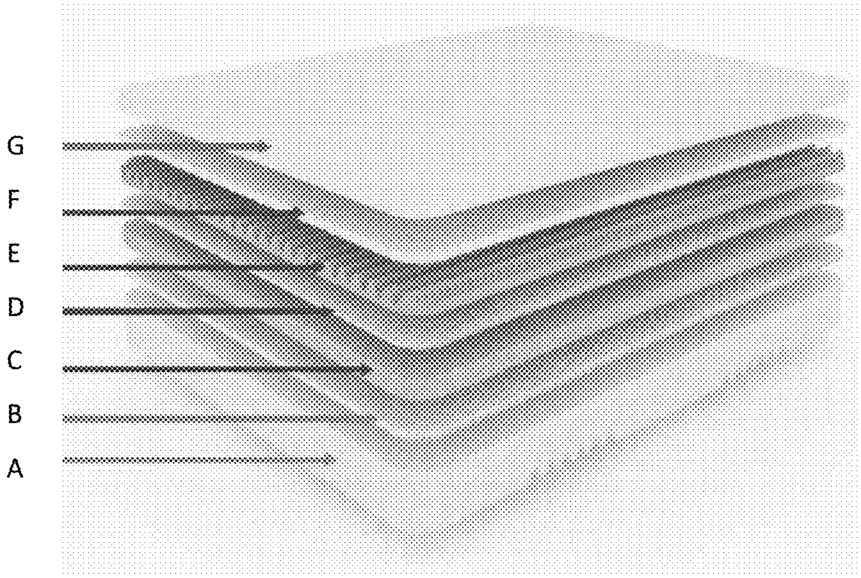
FIG. 1 is a mattress including two 3D spacer layers and a slow-recovery latex layer, as well as other layers.

The support system disclosed herein supports and relieves pressure exerted on and by the body. This support system evenly disperses pressure along the body, reduces point pressure, does not rely on location-specific "zones" of support, and provides a soft recovery feel.

The support system disclosed herein may be used to reduce and balance (or disperse) pressure on the human body. The support system may be a mattress, cushion (e.g. for a bed, seat, exercise, yoga, or wheelchair), exercise or standing mat, pad, pillow, mattress topper, sleeping pad, hospital bed, seat cushion, or other support of the whole or part of the human body.

The support system disclosed herein includes a first 3D spacer layer having a first thickness, a second 3D spacer layer having a second thickness, and a non-viscoelastic pressure relieving layer having a third thickness. Without being bound to one specific theory, it is believed that the first 3D spacer layer distributes pressure evenly to either the lowest base layer or layers of the system to the foundation upon which the system is placed, and the second 3D spacer layer helps reduce point pressure and evenly distribute pressure to the human body and through the layers of the support system, while the non-viscoelastic pressure relieving layer reduces the speed at which the first and second 3D spacer layers react to movement of the body atop the support system. The combination of these three layers provides a significant improvement over known support systems. The support system of the present disclosure relieves and disperses pressure, and adapts and responds to pressure points created by human anatomy and posture. The support system evens the distribution of support across the body and reduces pressure points exhibited by the human anatomy. The support system further provides these benefits without regard to the body's position or its relative position on the support surface. Pressure points are areas of the human body prone to experiencing increased pressure and weight-bearing resistance from a mattress, cushion, support pad, or the like.

The first 3D spacer layer comprises a 3D spacer fabric and may be about 5 mm to about 60 mm, about 10 mm to about 50 mm, about 15 mm to about 30 mm, about 20 mm to about 25 mm, or about 20 mm thick.

The second 3D spacer layer comprises a 3D spacer fabric, being the same or different from the material of the first 3D spacer layer, and may be about 3 mm to about 50 mm, about 5 mm to about 20 mm, about 8 mm to about 15 mm, or about 10 mm thick The thickness of the first 3D spacer layer (the first thickness) may be equal to or greater than the thickness of the second 3D spacer layer (the second thickness). In an embodiment, the first thickness is equal to the second thickness. In an embodiment, the first thickness is greater than the second thickness. The first thickness may be 1.5 times to 3 times greater than the second thickness. The first thickness may be two times greater than the second thickness.

The 3D spacer fabric is a textile that is a multi-faceted fabric comprised of two separate fabrics joined by a monofilament yarn to create a 3-Dimensional structure. The resulting composite material comprises two parallel layers of multifilament fabric separated spatially by an interior structural layer of monofilament, which may include but are not limited to polyester, PET, polyamide, and/or polypropylene. The monofilaments are situated such that they resist compression of the two planar surfaces of the fabric. The orientation, thickness and materials of the monofilaments can be modified to create varying levels of support, pressure reducing properties, stretch and resilience. Further, the two surface fabric layers may comprise one or more designs. Any 3D spacer fabric known in the art may be used in the support systems disclosed herein.

In an embodiment, either one of or both of the first or second 3D spacer layers may be constructed of a three-dimensional ("3D") spacer or polyester fabric that is constructed of two warp-knitted layers which are connected by pile mono filaments in a single knitting process. In another embodiment, either one of or both of the first or second 3D spacer layer may be constructed of two covering layers that are held apart from each other by a pile layer, as disclosed in Application Nos. DE102009013253A1, US20020104335A1, the contents of which are incorporated by reference herein. In turn, the pile layer is made up of pile threads which provide a degree of elasticity to the layer. A textile construction process is used to make the layer, with its physical properties being determined by the material used to make the pile and the thread composition.

For example, a three-dimensionally structured warp knitted fabric may be designed with a net texture for its top substructure and a plain texture for its bottom substructure. The net texture may be composed of hexagonal pores, yarn joining portions, and yarn branching portions. The three-dimensionally structured warp knitted fabric may have yarns connecting the top and bottom substructures at oblique angles with X-shaped intersections (X) in its course-wise cross-section. The yarns present between the substructure connecting yarns at their intersections to control them may be designed as substructure connecting yarn controlling yarns arranged linearly in the wale-wise direction. The linearly arranged substructure connecting yarn controlling yarns may comprise points at which they are stitched by knitting into the plain-texture bottom substructure at given intervals in a regular manner and portions connecting between the yarn stitched points where they are floating between the top and bottom substructures. The linearly arranged substructure connecting yarn controlling yarns may be arranged in the fabric at a rate of one per pore in the net texture in such a way that they are seen through the pores in the net texture as if to divide each of them into two parts. The yarn stitched points may be located below the yarn branching portions of the net texture, the location of which prevents them from being exposed in the pores of the net texture. In this embodiment, the linearly arranged substructure connecting yarn controlling yarns hold the substructure obliquely connecting yarns in the shape of an arch. In the three-dimensionally structured warp knitted fabric configured as described above, the substructure obliquely connecting yarns, whose intersections observed from the pores in the net texture are positively held downward by the linearly arranged substructure connecting yarn controlling yarns, present no problem of protruding from the hexagonal pores even when the fabric is subjected to compression while in use, which may otherwise cause them to be bent, resulting in their protrusion from the pores.

Exemplary commercially known 3D spacer fabrics that may be used include the Space Air R, Flex and Space Com textiles, available from PresslessGmbH, and fabrics produced by Mueller Textile of Wiehl, Germany. Other exemplary 3D spacer layers are described in U.S. Patent Application Publication No. 2007/0271705, which is incorporated herein by reference. In certain embodiments, other fibrous materials may be used.

The spacer materials may be constructed in a variety of way, but typically include three components: a top layer, a bottom layer and spacer elements that separate the top and bottom layers. The spacer materials are constructed to be both light weight and contain loosely arranged spacer elements that permit circulation through the spacer material. At the same time, the spacer material is firm enough to support the weight of a human, with sufficient resiliency so as to not interfere with blood flow when resting on the spacer material. The top and bottom layers are included to provide a stabilizing structure for the spacer elements. As such, these layers can also be breathable, and in many cases contain minimal structure, such as Strands, String, twisted fibers or the like that are coupled or welded together at spaced apart locations to form an open matrix, such as a diamond or other shaped open structure. In some cases, the top and bottom layers could also be a woven fabric or other type of lightweight breathable fabric. Also, the top layer and the bottom layer may be constructed differently from each other, such as by one having a tighter pattern. The spacer elements may be single strands or fibers that extend perpendicularly between the top and bottom layers, although in some cases they could be multiple fibers twisted or joined together, sometimes referred to as a yarn. Also, the spacer elements could be angled between the top and bottom layers or could form a loosely tangled arrange mentor matrix of fibers. In an example, the spacer elements may comprise pile monofilaments and the top and bottom layers are a knitted material, such as those commercial products made by Mueller Textile of Wiehl, Germany. 3D spacer layers may be stacked upon each other.

Each 3D spacer layer will have a degree of firmness. Some may be more firm while others may be more plush. The firmness helps with the overall posture of the mattress, affecting how firm or how plush the mattress feels to the user. The firmness of the first 3D spacer layer may the same as or different than the firmness of the second 3D spacer layer. The firmness of the first 3D spacer layer may be greater than the firmness of the second 3D spacer layer. The firmness of the first 3D spacer layer may be less than the firmness of the second 3D spacer layer. The stress compression value of the second 3D spacer layer may be greater than the stress compression value of the first 3D spacer layer. The stress compression value of the first 3D spacer layer may be greater that the stress compression value of the second 3D spacer layer.

The first 3D spacer layer may have a firmness, or more specifically, a stress compression value, of about 2.0 kPa to about 10.0 kPa, about 3.0 kPa to about 8.0 kPa, about 3.5 kPa to about 5.0 kPa, or about 4.0 kPa, and with sufficient structure to support the layers above the first 3D spacer layer and a human body.

The second 3D spacer layer may have a firmness, or more specifically, a stress compression value, of about 0.5 kPa to about 7.0 kPa, about 3.0 kPa to about 6.0 kPa, about 4.0 kPa to about 6.0 kPa, or about 6.0 kPa, and with sufficient structure to support the layers above the second 3D spacer layer and a human body.

In an embodiment, the first 3D spacer layer has a stress compression value of about 2.0 kPa to about 10.0 kPa, about 3.0 kPa to about 8.0 kPa, about 3.5 kPa to about 5.0 kPa, or about 4.0 kPa, and the second 3D spacer layer has a stress compression value of about 0.5 kPa to about 7.0 kPa, about 3.0 kPa to about 6.0 kPa, about 4.0 kPa to about 6.0 kPa, or about 6.0 kPa.

The non-viscoelastic pressure relieving layer may comprise a non-viscoelastic slow-recovery foam, such as slow-recovery latex foam, natural fibers, such as alpaca, wool, horse hair, camel hair, cotton, or a combination thereof, a micro-coil spring unit, grids of rubber, synthetic rubber or gel matrix, or soft latex foam. The non-viscoelastic pressure relieving layer may be optionally contoured or shaped to change its feel or pressure reducing properties, or may be optionally infused with additional compounds or materials to enhance functionality, which may include natural compounds, graphite, gels, texture enhancers, phase change materials, or antimicrobial compounds.

The non-viscoelastic pressure relieving layer may be of any reasonable thickness to provide the necessary interaction with the 3D spacer layers, which is to reduce the speed at which the first and second 3D spacer layers react to movement of the body atop a support system. The non-viscoelastic pressure relieving layer may be about 0.5 inches to about 3 inches, or about 0.5 inches to about 2 inches thick. The non-viscoelastic pressure relieving layer may be about 0.5, about 1.0, about 1.5 or about 2 inches thick.

The non-viscoelastic pressure relieving layer may comprise a non-viscoelastic slow-recovery foam. “Slow-recovery foams” are low-resilience foams; they compress gradually as force is applied and are slower to recover their original shape than conventional foams, such as polyurethane foams, when the force is removed. The non-viscoelastic slow-recovery foam may be made from latex, or other material that is able to achieve the same properties and is not a polyurethane or viscoelastic.

Non-viscoelastic slow-recovery foams used herein are different from conventional polyurethane foam, and viscoelastic foam, such as a memory foam. Polyurethane foam is a basic foam available with a wide range of densities, compression characteristics and softness feels. Conventional polyurethane foams can be used in any layer of a conventional mattress or cushion, and do not have slow recovery properties. In addition, a layer of conventional polyurethane foam (i.e., not having slow-recovery properties) may optionally be incorporated into the support system of disclosed herein in between or on top of one of the 3D spacer layers or non-viscoelastic pressure relieving layer disclosed herein.

The non-viscoelastic pressure relieving layer may comprise a slow-recovery latex. Latex is a stable dispersion of polymer microparticles in an aqueous medium that is whipped and heated to produce a foam. It can be naturally derived or synthetic. Latex foam layers are typically perforated and provide good airflow, anti-microbial properties, dust mite resistance, and high durability. They can be made in high-resilience or slow recovery variants. Any slow-recovery latex layer may be used in accordance with this disclosure, such as the slow-recovery latex manufactured by LATEXCO® or TALALAY GLOBAL.

The non-viscoelastic pressure relieving layer may comprise natural fibers, such as alpaca, wool, horse hair, camel hair, cotton, or a combination thereof. The natural fibers may be manufactured into a non-woven pad, or loose fibers filled into a quilted or non-quilted encasement, which may be made a woven or non-woven fabric. The weight of such a layer may be about 50 to about 200 grams per square inch, and/or have a thickness of about 0.5 inches to about 1.5 inches when added to the mattress (compressed thickness). Any such layer known in the art may be used in the present disclosure, for example, but not limited to those made by William T Burnett Co, or Brentwood Home.

The non-viscoelastic pressure relieving layer may comprise a micro-coil spring unit. Micro-coils or micro pocket coils are smaller, lighter, and narrower coils of wire than standard innerspring coils used in mattresses. These may be wrapped individually inside fabric pockets and/or foam. It may be configured in many a variety of ways, including "pocketed," that is when each coil is individually wrapped in a fabric material. The micro-coil spring unit may be about 0.5 inches to 2 inches in height, or about 0.5 inches to less than 2 inches in height.

The non-viscoelastic pressure relieving layer may comprise grids of rubber, synthetic rubber or gel matrix. Any grids of rubber, synthetic rubber or gel matrix known for use in support systems be used in accordance with the disclosure. Such a layer may comprise padding materials or cushions formed from an elastic foam matrix structurally supporting and one or more encapsulated gel elements. This layer may be about 0.5 inches to about 3 inches, or about 0.5 inches to about 2 inches thick. The rubber grid may be presented in a honeycomb, square or other polygonal grid. The gel matrix may be polyurethane gel and/or silicone gel. It will be understood that other viscous gel materials known in the art may be used. Rubber or gel matrix layers such as those described in U.S. Pat. Nos. 8,512,843 and 9,259,897, both of which are incorporated herein by reference in entirety, may be used in accordance with this disclosure.

The non-viscoelastic pressure relieving layer may comprise a soft, conventional latex foam. The latex foam may be any latex foam known for use in support systems and optionally may be treated with functional additives such as copper, carbon, antimicrobials, phase-change temperature regulating materials, and/or essential oils.

Indentation Load (Force) Deflection or ILD (IFD) is a test method applied to foams to determine firmness, stiffness or load bearing capacity. Indentation load deflection measures load required to indent a 50 square inch round indent or foot or compression platen into a foam sample. The non-viscoelastic pressure relieving layer used herein may have an ILD from about 14 to about 38, about 14 to about 28, about 19 to about 24, or any of the numbers therebetween, such as about 20, about 21, or about 22.

The first 3D spacer layer is positioned below the second 3D spacer layer and the non-viscoelastic pressure relieving layer. The non-viscoelastic pressure relieving layer may be positioned below or above the second 3D spacer layer. One or more layers of material (e.g., a comfort or structural layer) may be positioned between each of the 3D spacer layers and the slow-recovery layer. There may optionally be a base (or support) layer positioned below the first 3D spacer layer, such as, but not limited to a fiber pad, foam (e.g., polyurethane foam), spring layer, or other known support layer known in the art. There may optionally be a top layer above the uppermost layer of the second 3D spacer layer or non-viscoelastic pressure relieving layer, comprising one or more of a fiber or quilted layer, spring unit, foam layer, and fire-restricting layer. A quilted layer may include polyester, polyurethane, felled polyester fiber, kapok, shredded latex, cotton, wool, alpaca, horse hair, Kevlar, bamboo, down of duck or goose, feather of duck or goose, rayon, any combination thereof, or any other material known in the art.

When the non-viscoelastic pressure relieving layer is below the second 3D spacer layer, such that the non-viscoelastic pressure relieving layer is between the first and second 3D spacer layers, the first 3D spacer layer may be directly adjacent to the non-viscoelastic pressure relieving layer, or optionally there may be one or more comfort or structural layers between them. In addition, when the non-viscoelastic pressure relieving layer is below the second 3D spacer layer, the second 3D spacer layer may be directly adjacent to the non-viscoelastic pressure relieving layer, or optionally there may be one or more comfort or structural layers between them.

When the non-viscoelastic pressure relieving layer is above the second 3D spacer layer, such that the second 3D spacer layer is between the non-viscoelastic pressure relieving layer and the first 3D spacer layer, the first 3D spacer layer may be directly adjacent to the second 3D spacer layer, or optionally there may be one or more comfort or structural layers between them. In addition, when the non-viscoelastic pressure relieving layer is above the second 3D spacer layer, the second 3D spacer layer may be directly adjacent to the non-viscoelastic pressure relieving layer, or optionally there may be one or more comfort or structural layers between them.

The one or more comfort or structural layers that may optionally be incorporated between the non-viscoelastic pressure relieving layer, first 3D spacer layer and/or second 3D spacer layer may be a fiber pad, polyurethane foam, spring unit, or other known layering material known in the art.

A spring unit, as referred to herein, is a support, comfort or top layer that includes the use of wire springs. It can be configured in many a variety of ways, including "pocketed," that is when each coil is individually wrapped in a fabric material. The heights of the springs can vary from >8 inches to less than 2 inches in height, referred to as "micro-coils." The firmness, resilience and physical properties of springs can vary based on materials, manufacturing processes and shape. Spring units include traditional spring coil units, and pocket coil spring units.

In certain embodiments, the support system includes: i) a first 3D spacer layer about 5 mm to about 60 mm, about 10 mm to about 50 mm, about 15 mm to about 30 mm, about 20 mm to about 25 mm, or about 20 mm thick, having a stress compression value of about 2.0 kPa to about 10.0 kPa, about 3.0 kPa to about 8.0 kPa, or about 3.5 kPa to about 5.0 kPa; ii) a second 3D spacer layer about 3 mm to about 50 mm, about 5 mm to about 20 mm, about 8 mm to about 15 mm, or about 10 mm thick, and having a stress compression value of about 0.5 kPa to about 7.0 kPa, about 3.0 kPa to about 6.0 kPa, or about 4.0 kPa to about 6.0 kPa; and iii) a non-viscoelastic pressure relieving layer about 0.5 inches to about 3 inches, about 0.5 inches to about 2 inches, or about 2 inches thick. The thickness of the first 3D spacer layer is the same as or greater than the thickness of the second 3D spacer layer.

In another embodiment, a support system of the disclosure may include, from the bottom upward: i) a base layer, ii) a second base layer, iii) a first 3D spacer layer, iv) a first comfort layer, v) a non-viscoelastic pressure relieving layer, vi) a second 3D spacer layer, and vii) a top layer (e.g., a foam, protective fire resistant material, a covering fabric, quilted layer). In embodiments thereof, the base layer may be a polyurethane foam that having a thickness of about 1 to about 8 inches, or about 4 inches, and an ILB of about 28 to about 36, and the second base layer may be a 2 inch pocketed micro-coil spring unit. The first 3D spacer layer may be about 5 mm to about 50 mm, about 15 mm to about 30 mm, about 20 mm to about 25 mm, or about 20 mm thick, having a stress compression value of about 2.0 kPa to about 10.0 kPa, about 3.0 kPa to about 8.0 kPa, or about 3.5 kPa to about 5.0 kPa. The first comfort layer may be a second polyurethane foam or a latex form (conventional) having a thickness of about 2 inches and an ILD of about 29 to about 36. The non-viscoelastic pressure relieving layer may be slow-recovery latex foam about 0.5 to about 3 inches, or about 1 inch thick, and having an ILD of about 18 to about 28. The second 3D spacer layer may about 5 mm to about 20 mm, about 8 mm to about 15 mm, about 6 mm or about 10 mm thick, and having a stress compression value of about 0.5 kPa to about 7.0 kPa, 2.0 kPa to about 6.0 kPa, or about 4.0 kPa to about 6.0 kPa. The top layer may be a quilted layer made of natural fiber blend of wool and alpaca, or wool, alpaca and cotton.

In another embodiment, a support system of the disclosure may include, from the bottom upward: i) a base layer, ii) a first 3D spacer layer, iii) a non-viscoelastic pressure relieving layer, iv) a second 3D spacer layer, and v) a top layer (e.g., a foam, protective fire resistant material, a covering fabric, quilted layer). In embodiments thereof, the base layer may be an 8 inch high pocketed coil spring unit. The first 3D spacer layer may be about 5 mm to about 50 mm, about 15 mm to about 30 mm, about 20 mm to about 25 mm, or about 20 mm thick, having a stress compression value of about 2.0 kPa to about 10.0 kPa, about 3.0 kPa to about 8.0 kPa, or about 3.5 kPa to about 5.0 kPa. The non-viscoelastic pressure relieving layer may be a latex foam (conventional) about 0.5 to about 3 inches, or about 2 inches thick, and having an ILD of about 18 to about 28. The second 3D spacer layer may about 5 mm to about 20 mm, about 8 mm to about 15 mm, about 6 mm or about 10 mm thick, and having a stress compression value of about 0.5 kPa to about 7.0 kPa, 2.0 kPa to about 6.0 kPa, or about 4.0 kPa to about 6.0 kPa. The top layer may be a quilted layer made of natural fiber blend of wool and alpaca, or wool, alpaca and cotton.

When the support system is a mattress, the first 3D spacer layer may be a support layer, or portion thereof; the second 3D spacer layer may be a comfort layer or a top layer, or portion thereof; and/or the non-viscoelastic pressure relieving layer may be a comfort layer, or portion thereof.

Reviewing the support system from the bottom upward, a support system of the disclosure may be a mattress comprising a base layer (e.g., a first foam), a first 3D spacer layer, a first comfort layer (e.g., a second foam), a second 3D spacer layer, a second comfort layer (e.g., a third foam), and a non-viscoelastic pressure relieving layer. In embodiments thereof, the base layer may be a polyurethane foam, optionally convoluted, the first 3D spacer layer may be about 5 mm to about 50 mm, about 15 mm to about 30 mm, about 20 mm to about 25 mm, or about 20 mm thick, having a stress compression value of about 2.0 kPa to about 10.0 kPa, about 3.0 kPa to about 8.0 kPa, or about 3.5 kPa to about 5.0 kPa, the first comfort layer may be a second polyurethane foam, the second 3D spacer layer may about 5 mm to about 20 mm, about 8 mm to about 15 mm, or about 10 mm thick, and having a stress compression value of about 2.0 kPa to about 6.0 kPa, or about 4.0 kPa to about 6.0 kPa, the second comfort layer may be a latex foam(conventional), and the non-viscoelastic pressure relieving layer may be slow-recovery latex. There may further be a top layer positioned above the non-viscoelastic pressure relieving layer, optionally comprising a foam, protective fire resistant material, a covering fabric, quilt, or a combination thereof.

The support system disclosed herein may include a pillow top design, as understood by one of ordinary skill in the art. One or more of the second 3D spacer layer and the non-vi scoelastic pressure relieving layer may optionally be in the pillow top of the mattress.

A method of reducing point pressure on a body of a subject is also disclosed. The method includes the step of positioning the body on a support system comprising: a first 3D spacer layer having a first thickness; a second 3D spacer layer having a second thickness; and a non-viscoelastic pressure relieving layer having a third thickness. The subject may be any animal. The subject may be a human. Positioning the body includes, but is not limited to, lying down, standing, reclining, kneeling or sitting.

The meaning of the terms used in this method have the same meanings and definitions as used with respect to the embodiments discussed above.

A method of evaluating pressure and support properties of a support system is disclosed herein. The support system may be any such system known in the art, or it may be the support system disclosed herein comprising a first 3D spacer layer having a first thickness, a second 3D spacer layer having a second thickness, and a non-viscoelastic pressure relieving layer having a third thickness, In contrast, conventional methods of evaluating pressure and support properties have not been standardized and do not account for all of the criteria/measures of the novel method disclosed herein. The present method provides a means to calculate a single aggregate rating or score for determining the pressure and support properties of a support system. This novel method of evaluation accounts for the following measures, which can be captured and analyzed with any pressure mapping system of adequate precision and accuracy, such as the Tactillus-S pressure mapping system:

a. Area of elevated pressure: The total area of the body (e.g., in square inches) subjected to elevated pressure (i.e., above a certain threshold, including but not limited to, 25 mmHg, 32 mmHg, 50 mmHg or any number therebetween). Different thresholds may be chosen, though comparisons between support systems should best be evaluated with the same selected thresholds.
    i. Various data have demonstrated dermal blood flow reductions with elevated pressure:
        http://diabetes.diabetesjournals.org/content/51/4/1214.short
        https://www.tandfonline.com/doi/abs/10.1080/mic.5.2-3.227.233
        https://www.sciencedirect.com/science/article/pii/S0965206X14000539
b. Relative area of elevated pressure: The total surface area exposed to elevated pressure divided by the total area exposed to pressure above a detection threshold (i.e., 0.5 mmHg-10 mmHg); expressed as a percent
c. Relative pressure borne by "hot spots": This measurement represents how the average pressure inside selected "hot spot" regions relates to average pressure on the rest of the body. To calculate this, the following steps may be taken:

i. Create two rectangular selections encompassing the cervical and pelvic regions, attempting to cover approximately 30% of the total area of pressure above detection threshold (i.e., 0.5 mmHg-10 mmHg); combined, these are the "hot spots area."

ii. Calculate total pressure of these cervical and pelvic rectangular selections iii. Calculate the total pressure for the entire surface (exerted by entire body)

iv. Divide total pressure in selections by total pressure for the entire surface. Convert this to a percentage, which may be referred to as "Z."

v. Account for the difficulty of selecting a "hot spots area" that is exactly 30% of the total body area by: taking the actual % area of the whole selected as the "hot spots area" and subtract 30; and dividing this value by 30. This resulting number may be referred to as "Y."

vi. The final value for the relative pressure borne by the hot spots (P) is represented by the formula:

$$P=Y\times(1-Z)$$

d. Even Support Ratio: The average pressure of the Cervical/Shoulder and pelvic/hip zones is typically much higher than that of the lower thoracic and lumbar zones. Even support across the spine becomes more desirable as the ratio of these pressures approaches 1.

i. To measure this ratio:

1. Take the absolute value of the following:

a. The average pressure of a selection of the "hot spots area" (combined cervical+pelvic region);

b. Subtract the average pressure of a selection the lumbar region.

c. This value may be referred to as R

2. Divide R by the average pressure of the "hot spots." This may be converted to and shown as a %.

3. A score of 0 signifies completely even support and a score of 100% represents completely uneven pressure distribution.

e. Measurements in multiple sleep positions: One sleep position is a supine position with arms and legs slightly away from the body and palms down on the laying surface. Another sleep positions is a side-sleep position with hands placed in front of the face, knees slightly bent, one in front of the other and the lower foot tucked slightly inward vs the upper leg.

A method of evaluating pressure and support properties of a support system comprises calculating a Back Pressure and Support Score (BPSS).

A method of evaluating pressure and support properties of a support system comprises calculating a Side Pressure and Support Score (SPSS).

A method of evaluating pressure and support properties of a support system comprises calculating a Total Pressure and Support Score (TPSS).

A method of evaluating pressure and support properties of a support system comprises calculating one or more of a BPSS, SPSS, and TPSS. This analysis technique is designed to provide a blended, objective measure that may be used to compare the pressure and pressure distribution characteristics of two or more support systems. For each subdomain (A, P and S), a higher score is generally considered more favorable for sleep comfort and relief. In aggregate, a higher score is desirable for BPSS, SPSS and TPSS. There is no ideal or target score on the scale and scores can be greatly affected by a subject's height, weight and body type. For this reason, the BPSS, SPSS, and TPSS may be calculated and then compared between different support systems for one subject at a time. Comparisons between support systems are, therefore, interpreted based on relative differences rather than absolute score differences.

Calculating the BPSS, SPSS, or TPSS may comprise:

1. Placing a pressure sensing mat on top of the support system being evaluated;
2. Covering the pressure sensing mat with a tight fitting material;
3. Placing a subject on his/her back within an analysis area of the covered pressure sensing mat;
4. Measuring a first pressure reading from the pressure sensing mat;
5. Placing the subject on his/her side within the analysis area;
6. Measuring a second pressure reading from the pressure sensing mat;
7. Optionally repeating steps 1 through 6, one, two, three or four times;
8. Analyzing data by:
   i. Establishing low detection and high detection pressure thresholds;
      1. One is used to establish the boundary of the body to be analyzed, the other is used to determine "areas of elevated pressure"
   ii. For the first pressure reading and the second pressure readings, applying analysis software to determine the following:
      1. Area of high pressure
      2. Relative area of high pressure [A]
      3. Relative weight in pressure regions [P]
      4. Even Support ratio [S]; and
9. Tabulating a composite score for BPSS, SPSS, or TPSS according to one or more of the following formulae:

$$BPSS=100-[(2A_b+P_b+S_b)/3]$$

$$SPSS=100-[(2A_s+P_s+S_s)/3]$$

$$TPSS=100-([(2A_b+P_b+S_b)/3]+[(A_s+P_s+S_s)/3])/2$$

wherein, in each of the foregoing equations:

A=Relative area of high pressure;
P=Relative pressure borne by "hot spots";
S=Even Support Ratio;
Sub b=Back positon;
Sub s=Side position.

In step 2, a thin, tight fitting material, such as a sheet or linen, may be placed to cover the top of the pressure sensing mat. The material should be tight fitting such that it is secure and lays flat on the support system but not so tight as to exert undue pressure on the pressure sensing mat.

In step 5, the subject should lay on a side within the analysis area in a position with the hands atop one another in a "prayer" position in front of the face and the knees separated and slightly bent.

The analysis software used in step 8 may be any such software known in the art for calculating these variables. Optionally, for each data point, the method further comprises calculating the average of measurements captured from three separate "pressure images" taken from the subject; if one measurement is outside 15% of the mean of the other two, discarding that measurement and use a fourth measurement; and if three consistent measurements are not available, repeat steps 1-6 to collect the data again.

The pressure sensing mat is a measurement system known in the art for assessment of pressure distribution. A typical system includes a pressure-sensitive mat or pad, a capture device which may be a personal computer, tablet or cellular phone and software to capture and analyze data. One such system is the Tactilus® Real-Time Surface Pressure Mapping System.

The analysis area is the portion of the pressure sensing mat that collects data. The entire body of the subject should be within the analysis area.

A method of evaluating pressure and support properties of a support system may comprise calculating a BPSS of the support system, calculating a second BPSS of a second support system, and comparing the BPSS of the support system to the second BPSS of the second support system. The support system or second support system having the higher score may be considered to have better support properties than the other of the support systems.

A method of evaluating pressure and support properties of a support system may comprise calculating a SPSS of the support system, calculating a second SPSS of a second support system, and comparing the SPSS of the support system to the second SPSS of the second support system.

A method of evaluating pressure and support properties of a support system may comprise calculating a TPSS of the support system, calculating a second TPSS of a second support system, and comparing the TPSS of the support system to the second TPSS of the second support system.

The meaning of the terms used in the methods disclosed herein have the same meanings and definitions as used with respect to the embodiments discussed above.

The features and advantages of the present invention are more fully shown by the following examples which are provided for purposes of illustration, and are not to be construed as limiting the invention in any way.

EXAMPLES

Example 1

A mattress was made with seven layers as shown in FIG. 1. From the bottom up, the mattress included:

1. a base layer of convoluted polyurethane foam 6 inches thick with an ILD of 36 (A);
2. an 0.8 inches (20.32 mm) thick 3D spacer layer having a stress compression value of 4.0 kPa (B);
3. a layer of high density polyurethane foam 2 inches thick with an ILD of 18 (C);
4. an 0.4 inches (10.16 mm) thick 3D spacer layer having a stress compression value of 6.0 kPa (D);
5. a layer of convoluted D65 latex foam 2 inches thick (E);
6. a 1 inch thick (25.4 mm) slow-recovery latex foam layer with an ILD of 21 (F); and
7. a top layer including a fire restricting layer, a 0.5 inch soft polyurethane foam, and 1 inch thick cotton/polyester blend quilt (G).

The mattress of Example 1 was evaluated in comparison to a similar firmness traditional viscoelastic foam mattress using the following testing methods and criteria. A female subject, 40 yo. 135 lb, was asked to lie on both mattresses according to the outlined procedure and pressure data was captured. Pressures in an analysis area on each mattress were taken and tabulated and analyzed according to procedure.

Figure 2A:
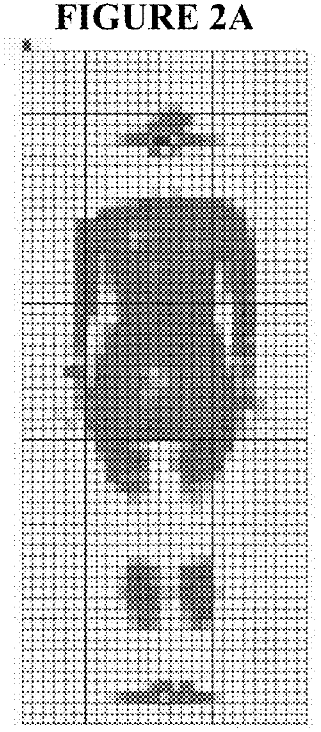
FIGS. 2A and 2B are visualizations of raw sensor data of a subject lying on a pressure sensing mat on top of a mattress in the supine and side position.
Figure 2B:
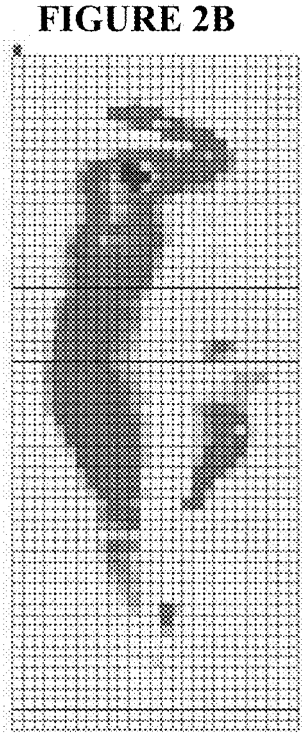
Figure 3:
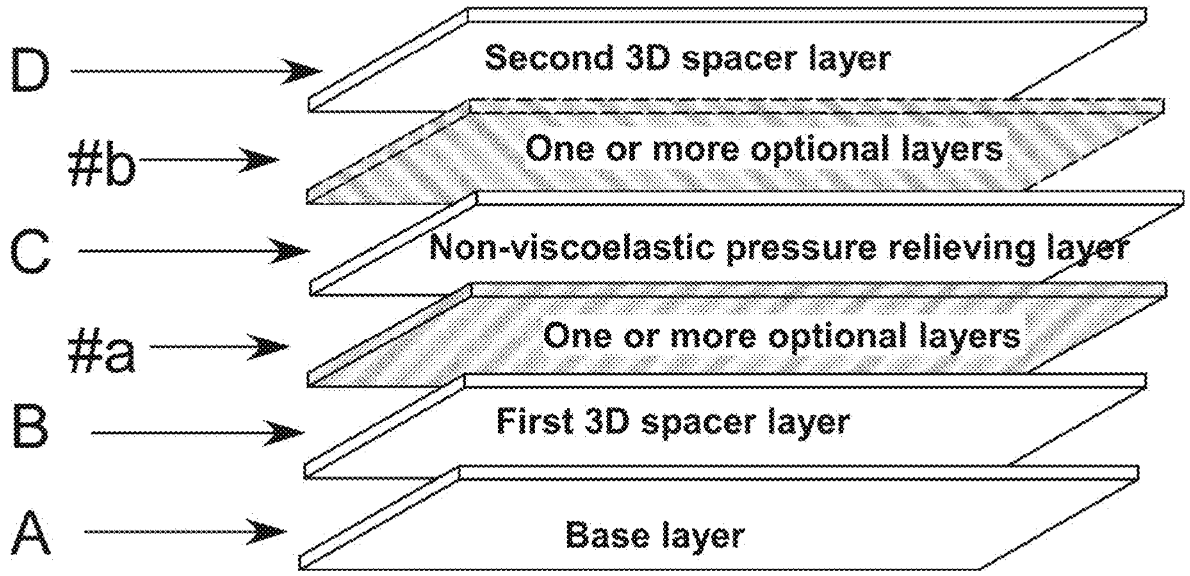
FIG. 3 illustrates an exemplary support system according to the present application presenting a base layer (A), a first 3D spacer layer (B), a non-viscoelastic pressure relieving layer (C), and a second 3D spacer layer (D) as provided in FIG. 1, and further illustrating one or more optional layers (#a) between the first 3D spacer layer (B) and non-viscoelastic pressure relieving layer (C), or one or more optional layers (#b) between a second 3D spacer layer (D) and non-viscoelastic pressure relieving layer (C).

FIG. 2A and FIG. 2B are illustrative examples of a grid showing visualization of raw sensor data, that is, relative pressure points along the body in a supine and side position on the Mattress of Example 1. On the grid, increasing pressure is indicated as colors move from light blue to dark blue, dark green, light green, yellow and red. Red indicates areas of high pressure.

Example 2

A comparative mattress was constructed using standard memory foam. In particular, the comparative mattress was constructed as shown in Example 1 except that the 3D spacer layers B, D were removed and the slow-recovery foam layer F was replaced with a 2" layer of viscoelastic foam having an ILD of 21 ("Comparative Memory Foam Mattress").

The BPSS, SPSS, and TPSS were calculated for the mattress of Example 1 and the Comparative Memory Foam Mattress according to the formulae:

$$BPSS=100-[(2A_b+P_b+S_b)/3]$$

$$SPSS=100-[(2A_s+P_s+S_s)/3]$$

$$TPSS=100-([(2A_b+P_b+S_b)/3]+[(A_s+P_s+S_s)/3])/2$$

Wherein, in each of the foregoing equations:

1. A=Relative area of high pressure
2. P=Relative pressure borne by "hot spots"
3. S=Even Support Ratio
4. Sub b=Back positon
5. Sub s=Side position The Low Pressure Detection Threshold was set at 1 mmHg, and the High Pressure Detection Threshold was set at 32 mm Hg.

BPSS for the mattress of Example 1 was 57.2 and 55.1 for the Comparative Memory Foam Mattress. SPSS for the mattress of Example 1 was 57.7 and 52.11 for the Comparative Memory Foam Mattress. TPSS for the mattress of Example 1 was 57.4 and 52.1 for the Comparative Memory Foam Mattress.

It is evident from a review of these Pressure and Support Scores that the mattress of Example 1 performs better than the Comparative Memory Foam Mattress. For one, the TPSS values have a relative difference over >10%.

Example 3

The BPSS, SPSS, and TPSS were calculated for two other mattresses within the present disclosure. One was constructed the same as the mattress of Example 1 except that a micro-coil was used in the place of the slow recovery latex foam layer. The second was constructed the same as the mattress of Example 1 except that a conventional latex foam was used in the place of the slow recovery latex foam layer. As with Example 1, the following formulae were used:

$$BPSS=100-[(2A_b+P_b+S_b)/3]$$

$$SPSS=100-[(2A_s+P_s+S_s)/3]$$

$$TPSS=100-([(2A_b+P_b+S_b)/3]+[(A_s+P_s+S_s)/3])/2$$

The Low Pressure Detection Threshold was set at 1 mmHg, and the High Pressure Detection Threshold was set at 32 mm Hg.

The results were tabulated and compared as shown in Table 1.

TABLE 1

Pressure Properties for Various Mattress

| Mattress | BPSS | SPSS | TPSS |
|---|---|---|---|
| Comparative Memory Foam Mattress | 55.1 | 52.1 | 52.1 |
| Mattress from Example 1 | 57.2 | 57.7 | 57.4 |
| Mattress from Example 1 except with micro-coil | 57.0 | 57.9 | 57.5 |
| Mattress from Example 1 except with latex foam (conventional) | 56.9 | 57.5 | 53.5 |

The results in Table 1 confirm that a mattress with a non-viscoelastic pressure relieving layer performs better, that is has better pressure and pressure distribution properties, than a memory foam mattress.

The foregoing illustrates some of the possibilities for practicing the invention. Therefore, although specific example embodiments have been described, it will be evident that various modifications and changes may be made to these embodiments without departing from the broader scope of the invention; many other embodiments are possible within the scope and spirit of the invention.

What is claimed:

1. A support system comprising:

first 3D spacer layer having a first thickness and a stress compression value of about 2.0 kPa to about 10.0 kPa, a second 3D spacer layer having a second thickness and a stress compression value of about 0.5 kPa to about 7.0 kPa, a non-viscoelastic pressure relieving layer having a third thickness, and a base layer that provides structural support positioned below the first 3D spacer layer, wherein the first 3D spacer layer is positioned below the second 3D spacer layer and the non-viscoelastic pressure relieving layer;

wherein the non-viscoelastic pressure relieving layer is positioned below the second 3D spacer layer, wherein the stress compression value of the first 3D spacer layer is greater than the stress compression value of the second 3D spacer layer; and wherein the first thickness is greater than the second thickness wherein the stress compression value of the first 3D spacer layer is greater than the stress compression value of the second 3D spacer layer; wherein the first thickness is greater than the second thickness; wherein one or more foam layers of material is positioned between the first 3D spacer layer and the non-viscoelastic pressure relieving layer and one or more foam layers of material is positioned between the second 3D spacer layer and the non-viscoelastic pressure relieving layer.

2. The support system of claim 1, wherein the non-viscoelastic pressure relieving layer is selected from the group consisting of a non-viscoelastic slow-recovery foam, microcoil springs, natural fiber, grids of rubber, synthetic rubber, gel matrix, latex foam, and combinations thereof.

3. The support system of claim 2, wherein the non-viscoelastic pressure relieving layer is the non-viscoelastic slow-recovery foam.

4. The support system of claim 1, wherein the first thickness is about 10 mm to about 50 mm.

5. The support system of claim 1, wherein the first 3D spacer layer has a stress compression value of about 2.0 kPa to about 8.0 kPa.

6. The support system of claim 1, wherein the second thickness is about 5 mm to about 20 mm.

7. The support system of claim 1, wherein the second 3D spacer layer has a stress compression value of about 2.0 kPa to about 6.0 kPa.

8. The support system of claim 1, where the non-viscoelastic pressure relieving layer comprises a slow-recovery latex.

9. The support system of claim 1, where the non-viscoelastic pressure relieving layer is about 0.5 inches to about 2 inches thick.

10. The support system of claim 1, wherein the first 3D spacer layer directly abuts the non-viscoelastic pressure relieving layer.

11. The support system of claim 1, wherein the second 3D spacer layer directly abuts the non-viscoelastic pressure relieving layer.

12. The support system of claim 1, wherein the support system is a mattress, cushion, pad, pillow, mattress topper, sleeping pad, hospital bed, seat cushion, exercise mat, yoga mat, or other support of a whole or part of the human body.

13. The support system of claim 1, wherein the support system is a mattress, wherein the non-viscoelastic pressure relieving layer comprises a slow-recovery latex.

* * * * *